United States Patent
Bryant

(10) Patent No.: US 10,051,694 B2
(45) Date of Patent: Aug. 14, 2018

(54) METHOD AND APPARATUS FOR DYNAMIC SELECTION OF ELECTRIC ARC-FURNACE CONTROL SET-POINTS

(71) Applicant: SGL Carbon SE, Wiesbaden (DE)

(72) Inventor: Billy Bryant, Rock Falls, IL (US)

(73) Assignee: Showa Denko Carbon Germany GmbH, Meitingen (DE)

(*) Notice: Subject to any disclaimer, the term of this patent is extended or adjusted under 35 U.S.C. 154(b) by 951 days.

(21) Appl. No.: 14/512,807

(22) Filed: Oct. 13, 2014

(65) Prior Publication Data

US 2016/0105932 A1  Apr. 14, 2016

(51) Int. Cl.

| | |
|---|---|
| H05B 7/156 | (2006.01) |
| H05B 7/148 | (2006.01) |
| C21C 5/52 | (2006.01) |
| F27B 3/28 | (2006.01) |
| G05B 13/02 | (2006.01) |

(52) U.S. Cl.
CPC .............. *H05B 7/148* (2013.01); *C21C 5/52* (2013.01); *C21C 5/5211* (2013.01); *F27B 3/28* (2013.01); *G05B 13/02* (2013.01)

(58) Field of Classification Search
CPC . H05B 7/00; H05B 7/005; H05B 7/11; H05B 7/144; H05B 7/148; H05B 7/152; H05B 7/156; C21C 5/52; C21C 5/5211; F27B 3/085; F27B 3/28; G05B 13/02

USPC .............. 373/70, 102, 104, 105, 106, 108
See application file for complete search history.

(56) References Cited

U.S. PATENT DOCUMENTS

| | | | | |
|---|---|---|---|---|
| 2006/0083286 | A1* | 4/2006 | Sedighy | F27B 3/28 373/102 |
| 2011/0276169 | A1* | 11/2011 | Bourg, Jr. | G05B 19/41865 700/109 |
| 2014/0130636 | A1* | 5/2014 | Lundh | C21C 5/5211 75/10.12 |

* cited by examiner

*Primary Examiner* — Hung D Nguyen
(74) *Attorney, Agent, or Firm* — Taylor IP, P.C.

(57) ABSTRACT

An electric arc furnace (EAF) including a set of mast hydraulics, a current transformer, a voltage transformer, a legacy control system and a set-point modifier. The legacy control system is in control of the set of mast hydraulics of the EAF, and receives information from the current transformer relative to current being supplied to the EAF and from the voltage transformer relative to voltage being applied to the EAF. The legacy control system using a set of set-points for the control of the set of mast hydraulics, the voltage and the current of the EAF. The set-point modifier communicates with the legacy control system, and executes the steps of: evaluating a cost function of key performance indicators of a previous heat of the EAF, the key performance indicators including electrical energy use and/or electrode consumption; and altering the set of set-points dependent upon the cost function.

20 Claims, 1 Drawing Sheet

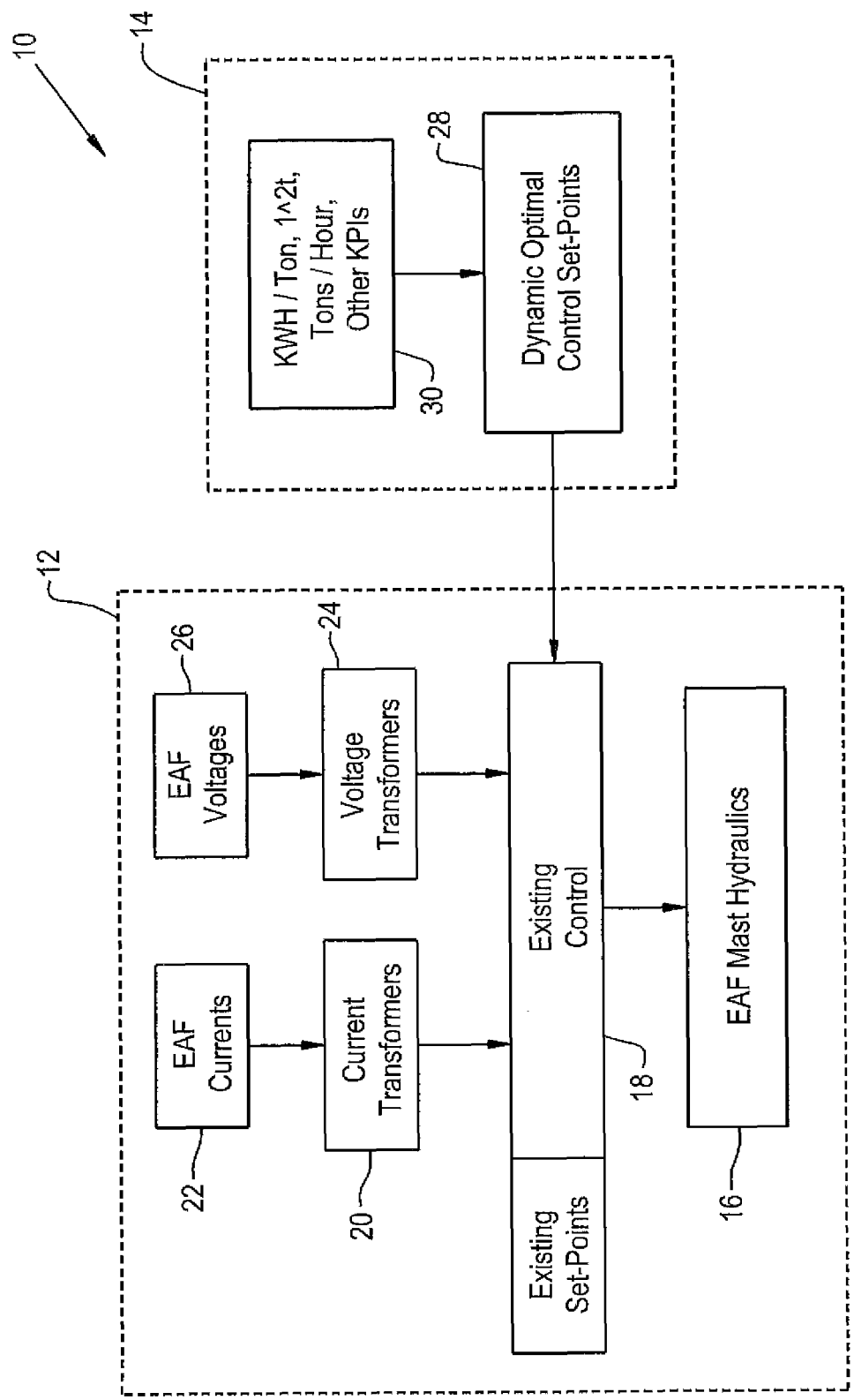

METHOD AND APPARATUS FOR DYNAMIC SELECTION OF ELECTRIC ARC-FURNACE CONTROL SET-POINTS

BACKGROUND OF THE INVENTION

1. Field of the Invention

The present invention relates to control systems for electric arc furnaces.

2. Description of the Related Art

An electric arc furnace (EAF) is a furnace that heats material by way of an electric arc. Arc furnaces range in size from small units of approximately one ton capacity up to about 400 ton units used for secondary steelmaking. On a much smaller scale arc furnaces for use in research laboratories and by dentists have a capacity of tens of grams. Industrial electric arc furnace temperatures can typically be up to 1,800° C., and laboratory units can exceed 3,000° C. Arc furnaces directly expose material to an electric arc, and the current in the furnace electrodes pass through the material.

An EAF generally includes a refractory-lined vessel covered with a retractable roof, through which one or more graphite electrodes enter the furnace. The EAF is primarily split into three sections: the shell, which consists of the sidewalls and lower steel "bowl"; the hearth, which is the refractory layer that lines the lower bowl; and the roof, which may be refractory-lined and/or water-cooled, and can be shaped as a section of a sphere, or as a conical section. The roof also supports the refractory through which the graphite electrodes enter.

A typical alternating current EAF is powered by a three-phase electrical supply having three electrodes that enter through the roof. Electrodes are typically round in cross-section, and are arranged in segments with threaded couplings, so that as the electrodes wear, new segments can be added. The arc forms between the material in the EAF and the electrode, the material is heated both by current passing through the material and by the radiant energy from the arc. The electrodes are raised and lowered by a positioning system, which may use either electric winches or hydraulic cylinders. The regulating system maintains approximately constant current and power input during the melting of the material, even though scrap may move under the electrodes as it melts. The mast arms holding the electrodes can be coupled with busbars to carry the electrical current or the mast arms may be "hot arms", where the whole arm carries the current. Hot arms may consist of copper-clad steel or aluminum. The electrodes move up and down for regulation of the arc, and are raised to allow removal of the furnace roof.

The EAF is often coupled to a tilting platform so that the liquid steel can be poured therefrom. A typical EAF could have a transformer rated about 60,000,000 volt-amperes (60 MVA), with a secondary voltage between 400 and 900 volts and a secondary current in excess of 44,000 amperes. Such a furnace would be expected to produce a quantity of 80 tons of liquid steel in approximately 50 minutes from charging the EAF with cold scrap to tapping the furnace. In comparison, basic oxygen furnaces can have a capacity of 150-300 tons per batch, or "heat", and can produce a heat in 30-40 minutes.

The process to melt the steel includes the lowering of the electrodes onto the scrap, causing an arc to be struck and the electrodes are then set to "bore" into the layer of scrap at the top of the furnace. Typically lower voltages are selected for this first part of the operation to protect the roof and walls from excessive heat and damage from the arcs. Once the electrodes have reached the heavy melt at the base of the furnace and the arcs are shielded by the scrap, the voltage is increased and the electrodes raised slightly, lengthening the arcs and increasing power to the melt. This enables a molten pool to form more rapidly, reducing tap-to-tap times.

What is needed in the art is a controller to optimize the EAF performance, to efficiently produce molten steel.

SUMMARY OF THE INVENTION

The present invention provides a device that executes a method of optimizing set-points for the control of an electric arc furnace.

The present invention in one form is an electric arc furnace (EAF) including a set of mast hydraulics, a current transformer, a voltage transformer, a legacy control system and a set-point modifier. The legacy control system is in control of the set of mast hydraulics of the EAF, and receives information from the current transformer relative to current being supplied to the EAF and from the voltage transformer relative to voltage being applied to the EAF. The legacy control system uses a set of set-points for the control of the set of mast hydraulics, the voltage and the current of the EAF. The set-point modifier communicates with the legacy control system, and executes the steps of: evaluating a cost function of key performance indicators of a previous heat of the EAF, the key performance indicators including electrical energy use and/or electrode consumption; and altering the set of set-points dependent upon the cost function.

The present invention in another form is a device for controlling an electric arc furnace. The device includes a legacy control system and a set-point modifier. The legacy control system uses a set of set-points for the control of the set of mast hydraulics, the voltage and the current of the EAF. The set-point modifier communicates with the legacy control system, and executes the steps of: evaluating a cost function of key performance indicators of a previous heat of the EAF, the key performance indicators including electrical energy use and/or electrode consumption; and altering the set of set-points dependent upon the cost function.

The present invention in yet another form is a method for altering set-points of a legacy control system that is in control of an electric arc furnace. The method includes the steps of: evaluating a cost function of key performance indicators of at least one previous heat of the electric arc furnace. The key performance indicators including electrical energy use and/or electrode consumption; and altering the set of set-points dependent upon the cost function.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein:

The FIGURE is a schematical block diagram of an embodiment of a control system of the present invention.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Referring now to the drawings, and more particularly to the FIGURE, there is shown a control system 10 that includes a legacy control system 12 coupled to an embodiment of a set-point modifier 14 of the present invention. Legacy control system 12 is shown to include a set of electric arc-furnace mast hydraulics 16 under the control of an existing control 18. Current transformers 20 are coupled to controller 18, with current transformers 20 being used by controller 18 for the control of EAF currents 22. In a similar vein, voltage transformers 24 are coupled to controller 18, with voltage transformers 24 being used by controller 18 for the control of EAF voltages 26.

Set-point modifier 14 includes a dynamic optimal controller of the set-points 28 and key performance indicator inputs 30. Set-point modifier 14 is in communication with controller 18 for the modification of the set-points therein.

The EAF produces steel in batches. A batch of steel is called a heat which is measured in tons. Consumables are measured as an accumulated value per heat. Consumable parameters (KWH, electrode consumption, etc.) are a total accumulated value per heat unless otherwise noted.

EAF controllers 18 are typically configured with a set of set-points as shown in table 1.

TABLE 1

| Typical EAF Control Configuration | |
|---|---|
| Limit | Set-Point |
| Limit 1 | Set-point 1 |
| Limit 2 | Set-point 2 |
| ... | ... |
| Limit n | Set-point n |

Limits are typically configured as electrical energy per ton of charged scrap (KWH/Ton) but sometimes are configured as electrical energy only (KWH), some combination of equivalent energy (electrical KWH plus converted chemical KWH/Ton) or even time.

EAF set-point configuration can take several forms and depends on the particular controller. Configuration of set-points in terms of EAF current 22 is very common and will be utilized in this description; however, it should be noted that other electrical parameters such as impedance, admittance, arc length and voltage can also be used and the algorithm of the present invention is capable of accommodating all forms.

Table 2 details an alternative EAF controller 18 configuration that is sometimes seen.

TABLE 2

| Alternative EAF Control Configuration | | |
|---|---|---|
| Limit | Set-Point Minimum | Set-Point Maximum |
| Limit 1 | Set-point 1 minimum | Set-point 1 maximum |
| Limit 2 | Set-point 2 minimum | Set-point 2 maximum |
| ... | ... | ... |
| Limit n | Set-point n minimum | Set-point n maximum |

In this configuration the set-points are given by a range which is interpolated with arc stability being frequently used as the interpolating metric but any parameter could be utilized.

Table 3 provides a specific example of an EAF control configuration.

TABLE 3

| Specific EAF Control Configuration | |
|---|---|
| KWH/Ton | Current (KA) |
| 25 | 65 |
| 100 | 50 |
| 200 | 55 |
| — | 60 |

In this example the controller would maintain a current of 65 kilo-amps (KA) until 25 KWH/Ton of energy is consumed. It would then maintain 50 KA until 100 KWH/Ton of energy is consumed, 55 KA until 200 KWH/Ton of energy is consumed and then 60 KA until completion of the heat.

In some cases the control gains (control output/input error) are also included in the configuration and iterated with the set-points in order to increase or dampen the response to control error throughout a heat. The gains can be constant or some form of variable gain encoding where the gain changes as a function of error. The algorithm is capable of accommodating controller gain as an additional variable to be optimized.

Nomenclature:

Lower case characters in bold represent vectors.

Upper case characters represent matrices.

Algorithm Outline:

The algorithm is iterative and can be described at a high level as follows:

1. Set $x_0$ equal to an initial EAF control configuration.
2. Set the iteration index k equal to 0.
3. Evaluate the cost function $f(x_k)$.
4. Form an estimate of the gradient $\nabla f(x_k)$ of the cost function.
5. Calculate the step length $\alpha$.
6. Calculate $x_{k+1}$ which is the next, more optimal control configuration.
7. Increment the iteration index.
8. Go to 3.

Detailed Description of the Algorithm:

1. Set $x_0$:

$x_0$ is a vector used to represent the initial control configuration. Each vector element corresponds to a field of the control profile. Utilizing the control profile detailed in table 3, $x_0$ is defined as follows:

$$\begin{bmatrix} x_0 \\ x_1 \\ x_2 \\ x_3 \\ x_4 \\ x_5 \\ x_6 \end{bmatrix} \equiv \begin{bmatrix} 25 \\ 65 \\ 100 \\ 50 \\ 200 \\ 55 \\ 60 \end{bmatrix}$$

Note that the final KWH/Ton field in the control profile is not included as an optimization parameter in the vector x.

2. Set the Iteration Index k=0:

k is utilized as the top level iteration index throughout the algorithm.

3. Evaluate the Cost Function $f(x_k)$:

The cost function provides an indication of the level of performance of a particular control profile. The cost function is typically evaluated after production of a single heat but could also utilize inputs averaged over several heats or could utilize some weighted or filtered combination of inputs from one or more heats. The cost function inputs would typically be key performance indicators 30 (KPIs) such as KWH/Ton but could be a weighted combination of multiple KPIs 30.

As an example assume that electrical energy and electrode consumption are KPIs 30 to be minimized. Electrical energy is measured in KWH/Ton on a per heat basis. Electrode consumption is typically measured over a longer time interval but can be approximated per heat by the $I^2t$ metric where $I^2$ represents EAF current squared and t is the EAF power on time. This results in the following cost function:

$$f(x_k) = \theta_1 \frac{KWH}{Ton} + \theta_2 I^2 t_{pon}$$

Where the θ's are weighting coefficients used as necessary to prevent a single parameter from dominating the cost function in the optimization algorithm.

The algorithm is constrained which means that the control configuration inputs must be bounded. There are many ways to constrain the algorithm and most involve augmentation of the cost function with some type of penalty term for violation of the constraints. Quadratic penalty terms are one type of term that can be utilized and will be detailed in this example. Assume that the current (I) must be constrained as follows:

45 KA ≤ I ≤ 70 KA

The cost function would be augmented with quadratic penalty terms as follows:

$$f(x_k) = \theta_1 \frac{KWH}{Ton} + \theta_2 I^2 t_{pon} + \phi_1 \max(-70 - I_1), 0)^2 +$$
$$\phi_2 \max(-(I_2 - 45), 0)^2 + \ldots +$$
$$\phi_1 \max(-(70 - I_4), 0)^2 + \phi_2 \max(-(I_4 - 45), 0)^2$$

Where max is the maximum operator, the Ø terms represent scaling parameters for the quadratic penalty terms and each $I_n$ represents the current set-point at the current iterate $x_k$.

4. Form an Estimate of the Gradient $\nabla f(x_k)$ of the Cost Function:

There are several ways to form an estimate of the cost function gradient. One such contemplated method is as follows:

For each element in $x_k$:

$$\nabla f_i(x_k) \approx \frac{(f(x_i + \epsilon_i) - f(x_k))}{\epsilon_i}$$

Where i is an index variable, each $x_i$ represents an element in x and $\in_i$ represents a perturbation value. As an example ε could be configured as follows:

$$\begin{bmatrix} \varepsilon_0 \\ \varepsilon_1 \\ \varepsilon_2 \\ \varepsilon_3 \\ \varepsilon_4 \\ \varepsilon_5 \\ \varepsilon_6 \end{bmatrix} \equiv \begin{bmatrix} 10 \\ 2.0 \\ 10 \\ 2.0 \\ 10 \\ 2.0 \\ 2.0 \end{bmatrix}$$

Which would provide perturbation values of 10 KWH/Ton and 2.0 KA for each limit and current set-point. The perturbation values do not need to be consistent and could be varied as necessary during the algorithm operation.

The element values of $\nabla f$ are estimated by producing at least one heat and evaluating the cost function at each $f(x_i + \in_i)$ combination. However, it is also contemplated that the cost function that results from several heats could be averaged or combined in a weighted averaging scheme.

5. Calculate the Step Length α:

The step length ∝ is used to scale the gradient $\nabla f(x_k)$ and provide an acceptable decrease in the cost function $f(x_k)$ (i.e. optimize the control profile). There are many possible ways that are contemplated to select the step length ∝. As an example, of one way, a backtracking sequence is used as follows:

Select $\propto = c_1$ (an arbitrarily selected constant)
Select $c_2 < 1$
While $c_2 f(x_k) < f(x_k - \alpha \nabla f(x_k))$
Produce at least one heat utilizing the control profile formed by $x_k - \alpha \nabla f(x_k)$.

Calculate the cost function $f(x_k - \alpha \nabla f(x_k))$. The cost function results from several heats could be averaged or combined in a weighted averaging scheme as necessary.

$$\text{Set } a = \frac{a}{2}$$

6. Calculate $x_{k+1}$ Which is the Next, More Optimal Control Configuration:

Set the next control profile equal to that found in step 5:
$x_k - \alpha \nabla f(x_k)$.

7. Increment the Iteration Index:

Set k=k+1.

8. Go to 3:

Return to step 3 and continue the sequence. An alternative would be to set some termination criteria such as a set number of algorithm iterations or an acceptable decrease in the cost function and exit the algorithm when the criteria have been met.

Specific Example

The following example utilizes the EAF control configuration provided in table 3 as the initial control set-point configuration:

TABLE 4

Initial EAF Control Configuration

| KWH/Ton | Current (KA) |
|---|---|
| 25 | 65 |
| 100 | 50 |

TABLE 4-continued

| Initial EAF Control Configuration ||
|---|---|
| KWH/Ton | Current (KA) |
| 200 | 55 |
| — | 60 |

A heat is produced utilizing the control configuration given in table 4.

$$\begin{bmatrix} x_0 \\ x_1 \\ x_2 \\ x_3 \\ x_4 \\ x_5 \\ x_6 \end{bmatrix} \equiv \begin{bmatrix} 25 \\ 65 \\ 100 \\ 50 \\ 200 \\ 55 \\ 60 \end{bmatrix}$$

The following results were obtained:
KWH/Ton=420

$I^2 t = 60\ KA^2 \times 40\ min = 144 \times 10^3\ KA^2\ min$

The cost function is:

$$f(x_k) = \theta_1 \frac{KWH}{Ton} + \theta_2 I^2 t_{pon} + \phi_1 \max(-(70 - I_1), 0)^2 + \phi_2 \max(-(I_1 - 45), 0)^2 + \ldots + \phi_1 \max(-(70 - I_4), 0)^2 + \phi_2 \max(-(I_4 - 45), 0)^2$$

—with $\theta_1 = 1$ and $\theta_2 = 10^{-3}$. The current is constrained as above and repeated here:

$45\ KA \leq I \leq 70\ KA$

The evaluation of $f(x_k)$ gives 564.
Form an estimate of the gradient $\nabla f(x_0)$ of the cost function:
The perturbation vector is:

$$\begin{bmatrix} \varepsilon_0 \\ \varepsilon_1 \\ \varepsilon_2 \\ \varepsilon_3 \\ \varepsilon_4 \\ \varepsilon_5 \\ \varepsilon_6 \end{bmatrix} \equiv \begin{bmatrix} 10 \\ 2.0 \\ 10 \\ 2.0 \\ 10 \\ 2.0 \\ 2.0 \end{bmatrix}$$

A minimum of 7 heats need to be produced, one for each element of the perturbation vector.
Heat #2a $x_0 + \varepsilon_0 \Rightarrow$

| KWH/Ton | Current (KA) |
|---|---|
| 35 | 65 |
| 100 | 50 |
| 200 | 55 |
| — | 60 |

The following results were obtained:

$KWH/Ton = 420$ $I^2 t = 147 \times 10^3\ KA^2 min$ $f(x_0 + \varepsilon_0) = 567$ $\nabla f_0(x_0) = \frac{(567 - 564)}{10} = 0.3$ Heat #2b $x_0 + \varepsilon_1 \Rightarrow$

| KWH/Ton | Current (KA) |
|---|---|
| 25 | 67 |
| 100 | 50 |
| 200 | 55 |
| — | 60 |

The following results were obtained:

$KWH/Ton = 420$ $I^2 t = 160 \times 10^3\ KA^2 min$ $f(x_0 + \varepsilon_1) = 580$ $\nabla f_1(x_0) = \frac{(580 - 564)}{2.0} = 8$ Heat #2c $x_0 + \varepsilon_2 \Rightarrow$

| KWH/Ton | Current (KA) |
|---|---|
| 25 | 65 |
| 110 | 50 |
| 200 | 55 |
| — | 60 |

The following results were obtained:

$KWH/Ton = 425$ $I^2 t = 145 \times 10^3\ KA^2 min$ $f(x_0 + \varepsilon_0) = 570$ $\nabla f_2(x_0) = \frac{(570 - 564)}{10} = 0.6$ Heat #2d $x_0 + \varepsilon_3 \Rightarrow$

| KWH/Ton | Current (KA) |
|---|---|
| 25 | 65 |
| 100 | 52 |
| 200 | 55 |
| — | 60 |

The following results were obtained:

KWH/Ton = 400

$I^2 t = 145 \times 10^3 KA^2 \min$ $f(x_0 + \varepsilon_3) = 545$ $\nabla f_3(x_0) = \dfrac{(545 - 564)}{2.0} = -9.5$ Heat #2e $x_0 + \in_4 \Rightarrow$

| KWH/Ton | Current (KA) |
|---|---|
| 25 | 65 |
| 100 | 50 |
| 210 | 55 |
| — | 60 |

The following results were obtained:

KWH/Ton = 420

$I^2 t = 145 \times 10^3 KA^2 \min$ $f(x_0 + \varepsilon_4) = 565$ $\nabla f_4(x_0) = \dfrac{(565 - 564)}{10} = 0.1$ Heat #2f $x_0 + \in_5 \Rightarrow$

| KWH/Ton | Current (KA) |
|---|---|
| 25 | 65 |
| 100 | 50 |
| 200 | 57 |
| — | 60 |

The following results were obtained:

KWH/Ton = 402

$I^2 t = 145 \times 10^3 KA^2 \min$ $f(x_0 + \varepsilon_5) = 547$ $\nabla f_5(x_0) = \dfrac{(547 - 564)}{2.0} = -8.5$ Heat #2g $x_0 + \in_6 \Rightarrow$

| KWH/Ton | Current (KA) |
|---|---|
| 25 | 65 |
| 100 | 50 |
| 200 | 55 |
| — | 62 |

The following results were obtained:

KWH/Ton = 405

$I^2 t = 144 \times 10^3 KA^2 \min$ $f(x_0 + \varepsilon_6) = 549$ $\nabla f_6(x_0) = \dfrac{(549 - 564)}{2.0} = -7.5$ This gives the following estimate for the gradient of the cost function at $$\nabla f(x_0) \approx \begin{bmatrix} 0.3 \\ 8 \\ 0.6 \\ -9.5 \\ 0.1 \\ -8.5 \\ -7.5 \end{bmatrix}$$

Find the step length $\alpha$:
Utilizing the backtracking sequence outlined above:
Select $\alpha = 1$
Select $c_2 = 0.99$
While $0.00 f(x_0) < f(x_0 - \alpha \nabla f(x_0))$
Produce at least one heat utilizing the control profile formed by $x_0 - \alpha \nabla f(x_0)$:

| KWH/Ton | Current (KA) |
|---|---|
| 25 − 0.3 = 24.7 | 65 − 8 = 57 |
| 100 − 0.6 = 99.4 | 50 − −9.5 = 59.5 |
| 200 − 0.1 = 199.9 | 55 − −8.5 = 63.5 |
| — | 60 − −7.5 = 67.5 |

The following results were obtained:

KWH/Ton = 410

$I^2 t = 145 \times 10^3 KA^2 \min$ $f(x_0 - \alpha \nabla f(x_0)) = 555$

Set $a = \dfrac{a}{2}$

555 < 558.36 (0.99×564) and so the full step is taken ($\alpha = 1$):

$x_1 = x_0 - (1)\nabla f(x_0)$ $k = k + 1$

The new control configuration is:

| KWH/Ton | Current (KA) |
|---|---|
| 24.7 | 57 |
| 99.4 | 59.5 |
| 199.9 | 63.5 |
| — | 67.5 |

The algorithm returns to step #1 and continues.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION

10 Control system
12 Legacy control system
14 Set-point modifier
16 Electric arc-furnace mast hydraulics
18 Existing control
20 Current transformers
22 Electric Arc Furnace Currents
24 Voltage transformers
26 Electric Arc Furnace Voltages
28 Set-Point Control
30 Inputs

What is claimed is:

1. An electric arc furnace, comprising:
    a set of mast hydraulics;
    a current transformer;
    a voltage transformer;
    a legacy control system in control of the set of mast hydraulics of the electric arc furnace, said legacy control system receiving information from said current transformer relative to current being supplied to the electric arc furnace and from said voltage transformer relative to voltage being applied to the electric arc furnace, said legacy control system having a memory containing a set of set-points for the control of the set of mast hydraulics, the voltage and the current of the electric arc furnace; and
    a set-point modifier in communicative connection with said legacy control system, said set-point modifier being configured to
        evaluate performance indicators of at least one previous heat of the electric arc furnace, the performance indicators including electrode consumption,
        said set of set-points being altered dependent upon said performance indicators by the set point modifier.

2. The electric arc furnace according to claim 1, wherein said set-point modifier applies coefficients to each of the performance indicators.

3. The electric arc furnace according to claim 2, wherein said set-point modifier augments at least some of the performance indicators with scaling parameters to arrive at new set point values.

4. The electric arc furnace according to claim 2, wherein said set-point modifier forms an estimate of a gradient of said performance indicators.

5. The electric arc furnace according to claim 4, wherein said set-point modifier uses said gradient of said performance indicators to develop a perturbation value for each element of said set of set-points.

6. The electric arc furnace according to claim 5, wherein said set-point modifier calculates a step length to be used to scale said gradient of said performance indicators.

7. The electric arc furnace according to claim 6, wherein said set-point modifier sets each set-point value in said set of set points to equal a previous set-point value minus a quantity of said step length times said perturbation value for each set-point value.

8. A device for controlling an electric arc furnace, the device comprising:
    a legacy control system in control of the electric arc furnace, said legacy control system having a memory containing a set of set-points for the control of the electric arc furnace; and
    a set-point modifier in communicative connection with said legacy control system, said set-point modifier being configured to
        evaluate performance indicators of at least one previous heat of the electric arc furnace, the performance indicators including electrode consumption,
        said set of set-points being altered dependent upon said performance indicators by the set point modifier.

9. The device according to claim 8, wherein said set-point modifier applies coefficients to each of the performance indicators.

10. The device according to claim 9, wherein said set-point modifier augments at least some of the performance indicators with scaling parameters to arrive at new set point values.

11. The device according to claim 9, wherein said set-point modifier forms an estimate of a gradient of said performance indicators.

12. The device according to claim 11, wherein said set-point modifier uses said gradient of said performance indicators to develop a perturbation value for each element of said set of set-points.

13. The device according to claim 12, wherein said set-point modifier calculates a step length to be used to scale said gradient of said performance indicators.

14. The device according to claim 13, wherein said set-point modifier sets each set-point value in said set of set points to equal a previous set-point value minus a quantity of said step length times said perturbation value for each set-point value.

15. A method for altering set-points of a legacy control system that is in control of an electric arc furnace, the method comprising the steps of:
    evaluating performance indicators of at least one previous heat of the electric arc furnace, the key performance indicators including electrode consumption; and
    altering said set of set-points dependent upon said performance indicators.

16. The method according to claim 15, wherein said evaluating step includes the step of applying weighting coefficients to each of the performance indicators.

17. The method according to claim 16, wherein said evaluating step further includes the step of augmenting at least some of the performance indicators with quadratic penalty terms.

18. The method according to claim 16, wherein said evaluating step further includes the step of forming an estimate of a gradient of said performance indicators.

19. The method according to claim 18, wherein said evaluating step further includes the step of using said gradient of said performance indicators to develop a perturbation value for each element of said set of set-points.

20. The method according to claim 19, wherein said evaluating step further includes the step of calculating a step length to be used to scale said gradient of said performance indicators.

* * * * *

UNITED STATES PATENT AND TRADEMARK OFFICE
CERTIFICATE OF CORRECTION

PATENT NO.         : 10,051,694 B2
APPLICATION NO.    : 14/512807
DATED              : August 14, 2018
INVENTOR(S)        : Bryant Page 1 of 1

It is certified that error appears in the above-identified patent and that said Letters Patent is hereby corrected as shown below:

In the Specification

Column 7
At Line 39, please delete "$f(x_k)$", and substitute therefore --$f(x_0)$--.

Column 8
At Line 51, please delete "$f(x_0 + \epsilon_0) = 570$", and substitute therefore --$f(x_0 + \epsilon_2) = 570$--.

Column 10
At Line 28, please delete "While $0.00f(x_0) < f(x_0 - \alpha \nabla f(x_0))$", and substitute therefore --While $0.99f(x_0) < f(x_0 - \alpha \nabla f(x_0))$--.

Signed and Sealed this
Seventh Day of April, 2020

Andrei Iancu
*Director of the United States Patent and Trademark Office*